(12) United States Patent
Harandi et al.

(10) Patent No.: US 9,890,334 B2
(45) Date of Patent: Feb. 13, 2018

(54) FLUID CATALYTIC CRACKING UNIT WITH LOW EMISSIONS

(71) Applicant: ExxonMobil Research and Engineering Company, Annandale, NJ (US)

(72) Inventors: Mohsen N. Harandi, The Woodlands, TX (US); Christopher G. Smalley, Manassas, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 80 days.

(21) Appl. No.: 15/156,637

(22) Filed: May 17, 2016

(65) Prior Publication Data
US 2016/0362614 A1 Dec. 15, 2016

Related U.S. Application Data

(60) Provisional application No. 62/172,953, filed on Jun. 9, 2015.

(51) Int. Cl.
*C10G 11/18* (2006.01)
*B01J 8/24* (2006.01)
(Continued)

(52) U.S. Cl.
CPC .............. *C10G 11/18* (2013.01); *B01J 8/24* (2013.01); *B01J 38/14* (2013.01); *B01J 38/36* (2013.01);
(Continued)

(58) Field of Classification Search
CPC ....... C10G 11/00; C10G 11/18; C10G 11/182; C10G 2300/4093; C10G 2300/70; B01J 38/14; B01J 38/36; B01J 8/24
See application file for complete search history.

(56) References Cited

U.S. PATENT DOCUMENTS 4,789,458 A 12/1988 Haddad et al.
5,360,598 A 11/1994 Terry
(Continued)

FOREIGN PATENT DOCUMENTS

EP 1201729 A2 5/2002

OTHER PUBLICATIONS

"Praxair + FCC Oxygen Enrichment," Praxair Technology, Inc. company brochure, 2010, www.praxair.com.
(Continued)

*Primary Examiner* — Brian McCaig
(74) *Attorney, Agent, or Firm* — Hsin Lin

(57) ABSTRACT

An FCC unit enables the normal regenerator to be eliminated by carrying out catalyst regeneration in the reactor section of the unit using air, oxygen-enriched air or even relatively pure oxygen as the stripping medium in the stripping section of the reactor while maintaining overall reducing conditions so that sulfur and nitrogen are produced in the form of hydrogen sulfide, ammonia and other reduced species. The combustion gases from the stripper are sent from the reactor with the cracking vapors to the FCC main fractionator, wet gas compressor and gas plant to process the by-products of the coke combustion along with the FCC reactor effluent. The principle is applicable to grass-roots FCC units with its potential for elimination of a major unit component but it also has potential for application to existing units to reduce the load on the regenerator or eliminate the need for the existing regenerator so that an existing regenerator may be converted to a parallel or auxiliary reactor system.

20 Claims, 3 Drawing Sheets

(51) Int. Cl.
*B01J 38/14* (2006.01)
*B01J 38/36* (2006.01)
*C10G 11/00* (2006.01)

(52) U.S. Cl.
CPC ... *C10G 11/182* (2013.01); *B01J 2208/00752* (2013.01); *C10G 2300/4093* (2013.01); *C10G 2300/70* (2013.01)

(56) References Cited

U.S. PATENT DOCUMENTS

| | | |
|---|---|---|
| 5,531,884 A | 7/1996 | Johnson et al. |
| 5,716,585 A | 2/1998 | Senegas et al. |
| 5,903,804 A | 6/1999 | Menon et al. |
| 6,139,720 A | 10/2000 | Lomas |
| 6,248,298 B1 | 6/2001 | Senior et al. |
| 7,470,412 B2 | 12/2008 | Rosen et al. |
| 7,744,746 B2 | 6/2010 | Cunningham et al. |
| 2013/0248420 A1 | 9/2013 | Palmas |
| 2014/0003187 A1 | 1/2014 | Davydov |

OTHER PUBLICATIONS

The International Search Report and Written Opinion of PCT/US2016/032844 dated Aug. 19, 2016.

FLUID CATALYTIC CRACKING UNIT WITH LOW EMISSIONS

CROSS-REFERENCE TO RELATED APPLICATIONS

This application claims priority to U.S. Provisional Application Ser. No. 62/172,953 filed Jun. 9, 2015, which is herein incorporated by reference in its entirety.

FIELD OF THE INVENTION

This invention relates to fluid catalytic cracking (FCC) and, by carrying the regeneration step in a new way, offers the possibility of eliminating the conventional regenerator or substantially reducing its size.

BACKGROUND OF THE INVENTION

An important feature of petroleum refining is the conversion of high molecular weight petroleum feeds such as vacuum gas oil (VGO) and heavier molecules to more useful and valuable products of lower molecular weight and boiling point. The fluid catalytic cracking unit (FCCU) is one of the most important units in the refinery, able to produce a large proportion of the gasoline pool as well as producing large volume of distillate range cracked products useful for the manufacture of diesel fuel. In the FCCU, high molecular weight feeds are contacted with fluidized catalyst particles with the conditions of the cracking process controlled according to the type of product desired; conditions such as temperature and contact time are controlled to maximize the products desired and minimize the formation of less desirable products such as light gases and coke.

Miscellaneous FCC riser and reactor designs have been utilized but with the advance of zeolitic cracking catalysts with greatly improved cracking activity, most modern FCC reactors utilize a short-contact time cracking configuration in which the amount of time that the catalyst and the FCC feedstream are in contact is limited in order to minimize the excessive cracking which results in the increased production of less valued products such as light hydrocarbon gases as well as increased coking deposition on the cracking catalysts. Current designs carry out the cracking of the feed in a riser which is a substantially vertical pipe with a feed injection zone at the bottom into which hot catalyst from the regenerator is fed to meet the incoming feed which is injected into the mix zone through nozzles with aid of steam. The regenerated catalyst enters the riser below the feed mix zone and is lifted up into the mix zone with lift gas. In the riser the vaporized feed is cracked into smaller molecules by contact and mixing with the hot catalyst; the cracking reactions take place in the catalyst riser within 10 seconds, typically 2-4 seconds. The mixture of hydrocarbon vapors and catalyst flows upward to enter the reactor vessel which now functions as a disengager to permit separation of the spent catalyst from the cracked hydrocarbon vapors. After disengagement from the catalyst, the spent catalyst flows downward through a steam stripping section to remove any hydrocarbon vapors before the spent catalyst returns to the catalyst regenerator. In the regenerator the coke which accumulates on the catalyst particles as a result of the carbon rejection which is the characteristic feature of the process is burned off with air to restore catalyst activity and selectivity as well as providing heat by the exothermic combustion of the coke to maintain a heat balance in the unit with the endothermic cracking reactions.

Most FCC reactor designs use mechanical cyclones internal to the reactor to disengage or separate the catalyst from the hydrocarbon reactor products as quickly and efficiently as possible. This rapid separation process has the benefits of both minimizing post-riser reactions between the catalyst and the hydrocarbons as well as providing a physical means for separating the products to be sent for further processing from the spent catalyst which is sent to the regenerator prior to being reintroduced into the riser as regenerated catalyst to continue the FCC cycle.

After separation from the spent catalyst, the FCC reactor stripping section utilizes a stripping medium, usually steam, to strip hydrocarbons from the spent FCC catalyst prior to the catalyst being sent to the regenerator. In the FCC regenerator, the spent catalyst is typically subjected to temperatures from about 1100 to about 1400° F. (about 590 to 760° C.) in order to regenerate the catalyst activity. The hydrocarbons that are not effectively stripped off of the catalyst in the stripper pass to the regenerator resulting in an increased combustion load on the FCC regenerator as well as having several other adverse impacts to an FCC unit: insufficient stripping of hydrocarbons in the FCC stripper can be a direct cause of loss in product output as well as resulting in increased regenerator emissions and other detrimental effects. Additional combustion of non-coke cracking products in the regenerator is undesirable as it increases contaminant concentrations in the regenerator flue gas and/or increases the regenerator flue gas rate resulting in increased air pollutant emissions from the FCC unit. Additionally, an inefficiently designed FCC stripping section will result in the use of an excess amount of steam in the FCC stripper and reactor. This excess steam can result in a decrease overall hydrocarbon processing capacity in the associated FCC fractionator tower as well as increasing the amount of water that must be removed from the hydrocarbon product and subsequently treated prior to disposal or reuse.

There have been apparatus designs intended to improve the catalyst/stripping gas contact in the FCC stripper. Many "disc and donut" stripper tray designs have been proposed to improve the stripping process associated with the "annular riser" FCC reactors in which the riser entering at the bottom of the reactor and rises up through its central axis. Examples of annular tray designs can be seen in U.S. Pat. No. 7,744,746 (Cunningham), U.S. Pat. No. 5,531,884 (Johnson), and U.S. Pat. No. 6,248,298 (Senior). Other stripper designs may be used in units with external risers. Stripper packings have also been proposed to increase the stripping efficiency of the stripper, for example, as in U.S. Pat. No. 5,716,585 (Senegas).

Hot stripping of the spent catalyst has been recognized as carrying advantages. U.S. Pat. No. 4,789,458 (Haddad), for example, describes an FCC process which includes high temperature stripping (hot stripper) to control the carbon level, hydrogen level, and sulfur level on the spent catalyst, followed by single or multi-stage regeneration.

U.S. Pat. No. 6,139,720, (Lomas) maximizes the production of carbon monoxide as a combustion off-gas by the use of a hot stripping zone arrangement that lifts hot stripped catalyst to the top of a bubbling-bed regeneration zone by an oxygen-starved lift stream. The process delivers spent catalyst with about 1 wt % of coke to the reaction zone and a spent combustion gas or flue gas stream having a $CO_2$ to CO ratio of at least 1.

For decades FCC has been the major air pollution contributor in refining. The heavy oil (high boiling range) feeds to the FCCU typically contain molecules containing high proportions of carbon (rejected as coke during the cracking)

as well as of sulfur and nitrogen compounds which convert under the reducing conditions of the cracking section to $H_2S$, $NH_3$ and HCN which leave the reactor with the cracked products. These contaminants have typically been handled in a relatively environmentally and economically friendly way by water washing, amine absorption, sour water stripping and sulfur plant processing steps. The main environmental and economic issue however has arisen from the operation of the regenerator. The flue gas from the regenerator can result in very large NOx, SOX, CO and particulate emissions which need to be controlled and reduced to comply with environmental regulations as well as an aspect of prudent and considerate refinery management. The refining industry has been spending major amounts money and effort in managing these emissions by means such as partial recovery/conversion in CO Boilers, Selective Catalytic Reduction (SCR) and Wet Gas Scrubbing to remove gaseous contaminants and with tertiary cyclones, electrostatic precipitators and baghouses to reduce particulate emissions. These environmental control measures have in themselves been expensive to implement in addition to the basis cost of the regenerator which, as a major component of the cracker is itself expensive. For a typical present day refinery the FCC regenerator and its flue gas recovery section can easily cost more than US$1B to construct and this while it generates negative value by consuming chemicals and creating waste.

Improvements in the operation of the regenerator with a view to reducing emissions by the use of oxygen enrichment have been proposed. U.S. Pat. No. 5,908,804 for examples, discloses the use of a regenerator operating with an oxygen-inert gas mixture in which the oxygen concentration is at least about 24 vol. % at a temperature at which most of the coke burns to a mixture of carbon monoxide and carbon dioxide, so substantially oxidizing the reduced nitrogen species that come from the coke to nitrogen oxides which are then passed through a reducing zone to convert them to elemental nitrogen.

An alternative proposal put forward in EP 1 201 729 (Menon) has been to inhibit the formation of nitrogen oxides in a carbon monoxide boiler by using fuel gas to burn carbon monoxide downstream of the regenerator by introducing an oxygen-enriched gas into the boiler, preferably with a nitrogen-enriched gas simultaneously added to the boiler.

The Praxair company has taken an interest in oxygen enrichment in the FCC regenerator: U.S. Pat. No. 7,470,412 (Rosen) discloses a process in which a hot oxygen stream is fed into a catalyst regenerator flue gas stream to remove carbon monoxide from the stream. NOx precursors such as $NH_3$ and HCN are converted into $N_2$ and if NOx is present in the flue gas stream the addition of the hot oxygen stream lowers the amount of NOx present. Praxair also advertises its oxygen enrichment technology in a company brochure, "Praxair+FCC Oxygen Enrichment" (available online).

These earlier proposals have, however, been along rather conventional lines in tacitly accepting the inevitability of the regenerator, either in the form of a dense bed regenerator as typically found in Kellogg Orthoflow™ units or a riser type regenerator as in UOP units.

SUMMARY OF THE INVENTION

We now propose a unique and unprecedented solution to the twin problems of regenerator capital cost and regenerator emissions by eliminating the regenerator from the FCCU. The FCC unit which we propose enables the regenerator to be eliminated by carrying out catalyst regeneration in the reactor section of the unit using air, oxygen-enriched air or, more preferably, even relatively pure oxygen as the stripping medium in the stripping section of the FCC reactor. This approach has the capability to comply with additional environmental regulations around the world for an environmentally friendly FCC technology: regulatory standards for FCC flue gas emission should be met by sending the flue gas either to the existing flue gas train and stack (with a reduced gas load) or to a new (or existing FCC) wet gas compressor to process all coke burning by-products typically with the FCC fuel gas from the reactor. The capability to eliminate the regenerator is envisaged as making a significant reduction in capital cost while still meeting environmental regulations; in addition, the FCC product yield should be improved by minimizing conventional coke make, potentially by at least a factor of two for the same feed. Reactor heat balance may dictate additional heat input to the reaction zone by increasing feed temperature, running a higher CCR containing feed, making the stripper less efficient or by alternative methods of heat input to the unit. While the invention is seen primarily as an innovation for grass-roots units because of its elimination of a major component of the FCCU, it also has potential for application to existing units to reduce the load on the regenerator. This will allow processing lower value, higher CCR feed.

The fluid catalytic cracking process according to the invention is carried out by contacting a stream of a heavy oil feed such as a vacuum gas oil or a resid with a stream of hot, particulate cracking catalyst in a cracking zone to crack the feed and form cracked hydrocarbon products of lower boiling range while depositing coke on the catalyst to form spent catalyst containing occluded hydrocarbons. The term "occluded hydrocarbons" is used in this specification to mean hydrocarbons located between the particles of the catalyst and within the internal pores of the catalyst. The cracked hydrocarbon products are then separated from the spent catalyst in a disengagement or separation zone and the separated spent catalyst containing the occluded hydrocarbons and deposited coke is passed directly to a zone in which catalyst stripping and regeneration both take place. In this zone the spent catalyst received from the disengagement zone is exposed to an oxygen-containing gas in a combined hydrocarbon stripping and regeneration step: the stripping action of the gas acts to drive the occluded hydrocarbons from the spent catalyst at a higher temperature than normal while, at the same time, regenerating the spent catalyst by combustion of the coke on the catalyst, so forming a stripped, regenerated catalyst at a higher temperature. The stripped, regenerated catalyst is then returned to the cracking cycle and into contact with a stream of heavy oil feed in the cracking zone.

The FCC unit in which the present process is carried out comprises:

i A cracking zone in which the heavy oil feed is contacted with a hot cracking catalyst to crack the feed and form cracked hydrocarbons of lower boiling range while simultaneously depositing coke on the catalyst to form a spent catalyst containing occluded hydrocarbons;

ii A disengagement zone, typically in the form of a cyclone system, in which the cracked hydrocarbons are disengaged or separated from the coked spent catalyst containing occluded hydrocarbons;

iii A stripping/regeneration zone in direct communication with the disengagement zone for receiving spent catalyst containing occluded hydrocarbons and deposited coke directly from the disengagement zone; the stripping zone is operated with a supply of an oxygen-containing stripping and regeneration gas and enables the spent catalyst to be exposed in the stripping zone to the oxygen-containing stripping and regeneration gas to strip the occluded hydrocarbons from the spent catalyst and regenerate the spent catalyst by combustion of the coke on the catalyst;

iv A conduit for conveying the regenerated catalyst from the stripping/regeneration zone back into contact with a stream of heavy oil feed in the cracking zone.

DRAWINGS

DETAILED DESCRIPTION

Figure 1:
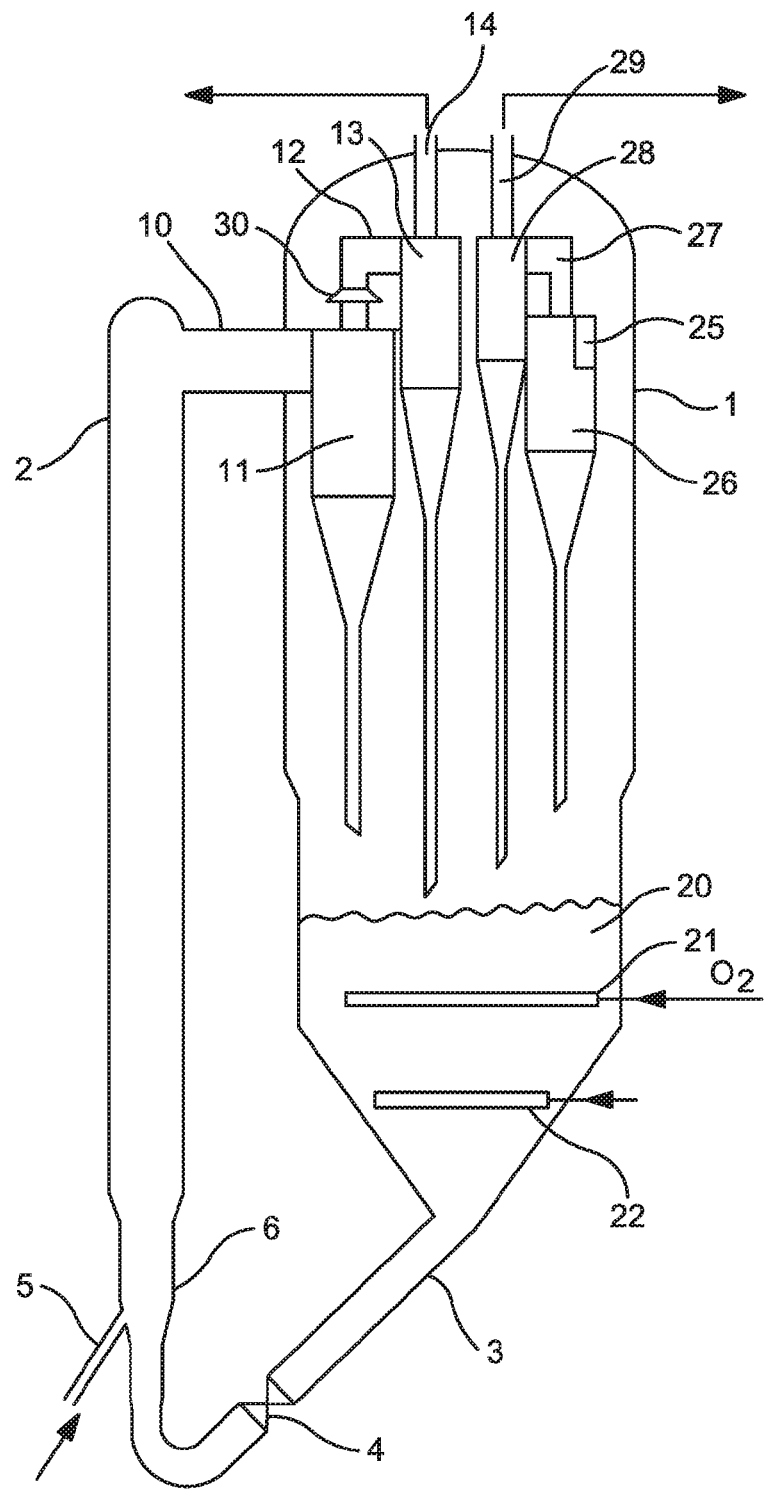
FIG. 1 is an extremely simplified diagram of a fluid catalytic cracking unit with an external riser and an oxygen-fed stripper section.

According to the present invention, the stripping gas in the stripper section is constituted by air, oxygen-enriched air or even pure oxygen. Pure, or relatively pure oxygen injected into the FCC reactor stripper will react with the coke on the spent catalyst to form $H_2O$, CO and $CO_2$ although with the reducing environment in the stripper and proper control of the oxygen flow rate relative to the coke-on-spent-catalyst rate, not much $CO_2$ will be formed. Generally, the flow rate of the oxygen should be held at a level which reduces the carbon on the regenerated equilibrium catalyst to the value which confers the desired catalyst activity. In a hypothetical worst case, the ratio of CO to $CO_2$ would be 1:1, preferably it will be more than 2:1 and most preferably more than 5:1. To minimize $CO_2$ production good distribution of oxygen should be employed, either uniformly around the periphery of the stripper or, if the flow of the catalyst down the stripper is known to be non-uniform, in accordance with the known catalyst flow pattern. Multiple injections of oxygen into the regeneration and stripping zone can be utilized at different vertically-spaced levels in the stripper. It is important to minimize $CO_2$ formation since it allows minimization of $O_2$ usage and maximization of catalyst circulation for heat balance which typically favors higher FCC yields.

The flow rate of the stripper oxidant gas relative to the flow of carbon on the spent catalyst should be carefully regulated to ensure as a minimal precaution that excess oxygen does not enter the reactor vessel above the stripper to burn valuable hydrocarbons and cause undo temperature rise. Adding too much oxygen can defeat the purpose of the invention to maintain a reducing environment to minimize $SO_X$, $NO_X$ and $CO_2$ formation as well as minimizing costs. Additional steam may be sparged into the reactor vessel with oxygen to minimize local hot spots and help operability and reliability of the system. In addition, the oxidant gas should be injected through the inlet orifices/nozzles at a low velocity to minimize or eliminate corrosion.

The volume of combustion gas generated by oxygen stripping will not be great given that the typical amount of coke on catalyst is about 4 percent by weight, added to this is the fact that by operating with oxygen, the volume of regenerator off-gas is reduced about 50-80 percent by the absence or near absence of nitrogen, depending on the purity of the oxygen supply; this gas volume will not be great compared to the much larger volume of the cracking product vapors and the normal stripping steam.

When the oxygen injection rate is properly controlled relative to the carbon rate on the catalyst, the reaction products of the oxygenated coke stripping/regeneration will, in addition to water in the form of steam mainly include carbon monoxide which, with its high combustion value is a good addition to FCC fuel gas. Accordingly, it is desirable to operate the stripper with a level of oxygen so that combustion of the coke is held at a level which ensures that the equilibrium catalyst contains the desired level of coke to maximize CO to $CO_2$ ratio in the stripper off-gas as to enhance the value of the fuel gas from the stripper. The removal of coke from the catalyst is at its greatest as the catalyst moves downwards through the stripper/regenerator towards the oxygen sparger at the bottom of the stripping zone where the highest relative oxygen concentration is found in the region of the sparger. Injection of the oxygen in the lower portion of the stripper section therefore enables the e-catalyst to have the desired level of residual coke. The higher carbon concentration at the top of the bed will act to reduce the $CO_2$ passing up from lower levels by reduction to CO which is desirable both from the viewpoint of reducing the oxygen requirement but also of producing a fuel gas with a relatively high heating value. This implies that the overall reaction in the stripper should be maintained under reducing conditions which will promote formation of reduced inorganic species such as $H_2S$, $NH_3$, HCN etc from the organic contaminants in the petroleum feed as well as reducing oxygen consumption.

The combustion products formed in the stripper (typically comprising mainly CO and $H_2O$) act as a stripping medium at a higher than normal temperature, preferably replacing the steam injected into a conventional FCC stripper to remove the hydrocarbons entrained with the spent catalyst entering from the reactor; steam may, however, be injected with the oxygen. The stripper off-gas will contain a minor fraction of $C_5$+, olefinic LPG and ethylene as well as hydrogen, ethane and methane. The combustion zone may run at a higher temperature than the typical FCC stripper, possibly up to about 1800° F. (about 980° C.) although the preferred temperature range for the regenerated catalyst is from 1250° F. to 1500° F. (about 815° C. to about 675° C.).

In the case of the normal negative pressure cyclone, the stripper gases containing the combustion products and stripped hydrocarbons can exit the reactor and pass to the main column either via a separate set of two stage cyclones or through the reactor cyclone via a vent in the cyclone inlet, normally in the duct connecting the gas outlet of the primary riser cyclone inlet to the inlet of the secondary riser cyclone. If a separate set of cyclones is used, the stripper gases can be routed directly to the main column overhead receiver via a set of coolers. The regenerated catalyst will pass through a slide control valve in the normal way and return to the riser for cracking fresh feed. Thus, the reactor riser effluent and stripper off-gas may be either taken off from the reactor through a common cyclone and then co-processed as a combined stream downstream of the cyclone in the main fractionator column, wet gas compressor and/or unsaturated gas plant of the unit or, alternatively, the stripper off-gas can be removed separately from the stripper off-gas through separate cyclone systems, followed by separate downstream processing.

FIG. 1 is a very much simplified outline of an external riser FCCU with an oxygen-fed stripping/regeneration section. The unit comprises a reactor 1 with an external riser 2 connected to the foot of the reactor by means of a regenerated catalyst standpipe 3 fitted with slide valve 4 to control the flow of catalyst in the normal way. The heavy oil feed with any recycle is introduced through feed inlet 5 to meet the hot, regenerated catalyst in mixing zone 6. The mix of cracked products and catalyst passes from the top of riser 2 through transfer duct 10 into the primary reactor cyclone 11 in which the majority of the spent catalyst is separated from the cracked hydrocarbon vapors which then pass by way of duct 12 to the secondary reactor cyclone 13. Finally, the cracked hydrocarbon vapors leave the reactor cyclones through duct 14 to pass to the main column flash zone.

The separated catalyst passes down the diplegs of cyclones 11 and 13 directly into a bed of catalyst in the stripper section of the reactor vessel where it is met by a stream of oxygenated stripping gas from plate sparger 21. The stripping gas leaving the sparger will comprise air, oxygen enriched air or relatively pure oxygen, depending on the composition supplied to the unit and as the gas stream ascends through the bed of catalyst which is maintained in a fluidized state by the passage of the gas, its composition will change progressively to comprise varying amounts of $CO$, $CO^2$, $H_2O$ and $O_2$ as the gas passes up through the bed; the composition will change with the height of the bed with the proportion of the carbon oxides and water increasing with height in the bed. The combustion of the reaction coke in the stripper is initiated at the bottom of the stripper where the oxygen is injected; as the combustion products pass upwards in the stripper, the descending stream of catalyst is heated by the heat from the combustion reactions taking place lower down in the stripper above the oxygen injection point. In this respect, the stripper will function at temperatures preferably exceeding those in a hot stripper of the type described in U.S. Pat. No. 4,789,458 or U.S. Pat. No. 6,139,720. The combustion gases passing upwards in the stripper will be subject to reduction over the hot reaction coke on the catalyst so that a high $CO:CO_2$ ratio such as 4:1 or higher is typically maintained in combustion product as the oxygen content of the stripper gas decreases with increasing height in the stripper. Similarly, sulfur oxides and nitrogen oxides are subjected to reductive reactions with the result that stripper off-gases will tend to contain $H_2S$ and $NH_3$ as opposed to the SOx and NOx from a conventional regenerator which are more difficult to handle and eliminate. Steam or nitrogen is admitted through a lower sparger 22 as displacement gas to ensure that the stripping gas passes up through the catalyst rather than passing down the standpipe to the riser.

The amount of injected oxygen should be related to the coke rate through the stripper so as to ensure an oxygen deficiency in the stripper off gases. This is significant not only from the viewpoints of generating a useful fuel gas with a reasonably high energy value from its CO content but also with a view to promoting the formation of reduced sulfur and nitrogen species for subsequent removal in the recovery section. Perhaps more importantly, however, the maintenance of an oxygen-deficient environment will provide a safeguard against explosive conditions arising from the stripper off-gasses in downstream equipment. An auto-lock safety system can be set to terminate oxygen injection if the temperature in the disengage falls below certain temperature for example about 480° C. (about 900° F.).

The stripper gases comprising stripped hydrocarbon vapors, ($H_2O$, $CO$, $CO_2$ and $H_2$ as well as sulfur and nitrogen species) pass upwards from the stripping bed and leave the reactor vessel by way of inlet 25 to the primary stripper cyclone 26. The gases separated in cyclone 25 then pass through transfer duct 27 to secondary stripper cyclone 28 and finally out of the reactor vessel by way of duct 29 leading to the fuel gas system. The stripper off gases may alternatively or in addition be removed from the reactor by way of vent 30 in the outlet duct of the primary reactor cyclone. Catalyst entrained in the stripper vapors is separated in the stripper cyclones 26 and 28 and then passes down through the diplegs of these cyclones to be returned to the spend catalyst bed underneath. The stripper overhead vapor and riser effluent can utilize the same set of cyclones and only one stream will be leaving as the reaction section product to the main column.

Figure 2:
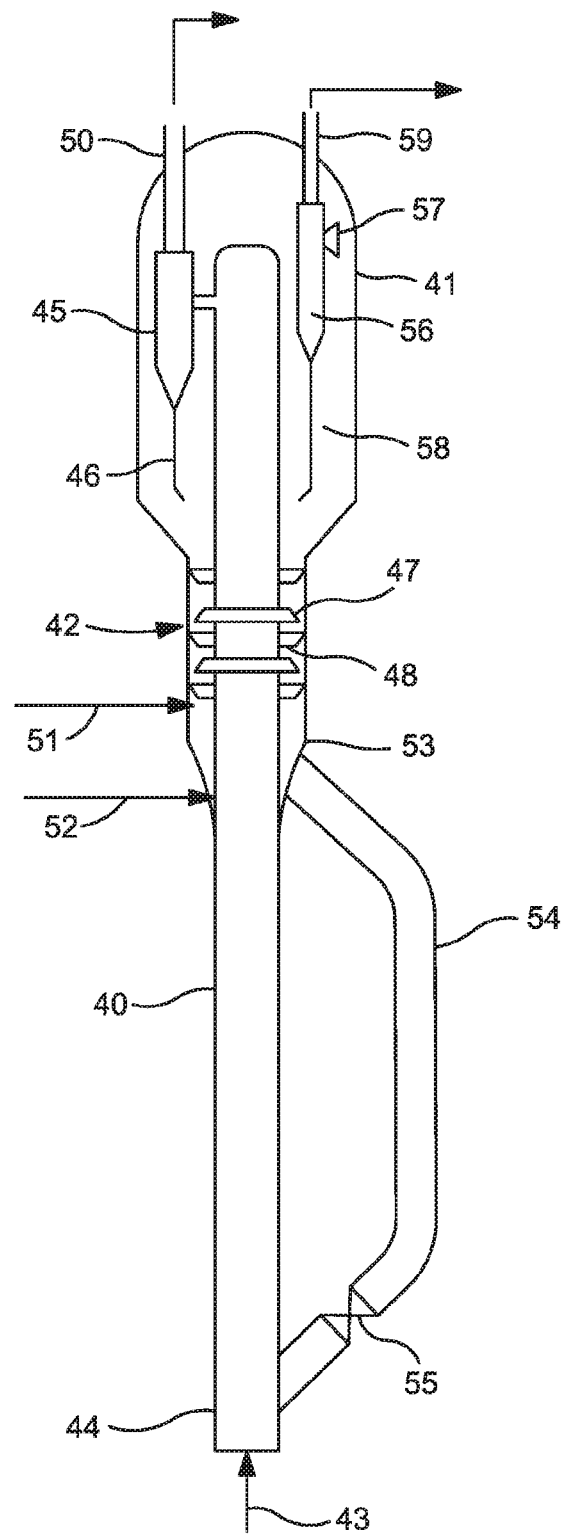
FIG. 2 is an extremely simplified diagram of a fluid catalytic cracking unit with an axial riser and an oxygen-fed stripper section.

In FIG. 2, the unit has a riser 40 and reactor vessel 41 with the riser disposed centrally on the vertical axis of the reactor, entering through the bottom of the vessel and passing centrally up through stripper section 42. Feed inlet 43 enters at the foot of the riser to meet the incoming regenerated catalyst in mixing zone 44. The mixture of cracked vapors and catalyst leaves the riser and passes into the reactor cyclone system shown diagrammatically as a single cyclone 45 although normally a secondary cyclone will be provided in the conventional manner. Dipleg 46 returns the catalyst from the reactor cyclone to the stripping section 42 underlying the main body of the reactor. The cracked hydrocarbon vapors pass out from the cyclone to the main column through line 50.

Stripper/regenerator 42 is fitted with stripping trays in the form of co-operating pairs of cone frusta 47, 48 (only one pair designated) for improving contact between the catalyst and the stripping gas. The oxygen-containing gas for stripping and regenerating enters by way of line 51 underneath the lowermost of the stripping trays and is provided with a sparger (not shown) to distribute the gas evenly around the circumference of the stripper cross-section. Steam to maintain fluidization and prevent downward flow of oxygen enters from a sparger (not shown) fed by means of line 52 below entry port 53 to catalyst return standpipe 54.

The stripping trays are arranged in pairs, as noted, with one tray of each pair extending downwardly from the walls of the stripper and the other of the pair downwardly from the riser to which it is attached. In this way, the catalyst is impelled into a tortuous downward path in the stripper, passing alternately inwards and outwards towards and away from the riser as the stripping gases rise up from below. In this way, the trays disrupt the downward flow of the catalyst to increase the efficiency of the stripping operation. In order to improve catalyst/stripping gas contact further, the trays may be given apertures through which the stripping gas can pass as the catalyst passes over the try with some catalyst falling down through the apertures for additional mixing; the gases which accumulate under the trays will generally be effective to provide an upward gas flow through the apertures. The apertures will normally be located towards the free edge of each tray. The trays may also be equipped with rotation vanes to impart a rotation vector around the riser as the catalyst descends in the stripper with a further improvement in catalyst/gas contact. Reference is made to U.S. Pat. No. 6,248,298 (Senior) for a description of such rotator vanes fitted with gas flow apertures in an axial stripper.

From the stripper, the regenerated catalyst passes down to the slide valve 55 near the foot of standpipe 54 and then into mix zone 44 of the riser section. The conventional standpipe configuration has been maintained in order to retain mix zone geometry which has been found to provide favorable performance.

The stripper and combustion gases pass out of reactor vessel 41 by way of the stripper cyclone system (represented simply as a single cyclone although typically a system comprising a primary and a secondary cyclone will be used), entering through cyclone inlet horn 57. The separated catalyst particles are returned form cyclone system 56 by way of cyclone dipleg 58. The separated stripper and combustion gases leave through the gas outlet of the cyclone system, passing to the refinery gas treatment and recovery system through line 59.

There will be a temperature increase resulting from the combustion of the coke in the stripper between 300-450° F. (about 150-230° C.) depending on the delta coke and the $CO/CO_2$ ratio so that the desired stripper temperature is achieved. The stripper will be significantly hotter at the bottom where $O_2$ is added to the stripper and essentially all the coke on catalyst to be combusted has been combusted. As catalyst is moving down the stripper it becomes hotter and hotter. As temperature is increasing in the stripper so is coke cracking reactions resulting in recovery of hydrocarbons including cracked light hydrocarbons. This significantly reduces the amount of coke on the catalyst resulting in a lower demand for oxygen molecules injected into the stripper. The temperature of the regenerated catalyst will therefore be similar to or higher than conventional FCC regenerated catalyst temperatures and the riser cracking process will not be materially affected since other parameters such as feed temperature and quality is adjusted to maintain heat balance The temperature of the catalyst returning to the riser can be controlled by adjusting the rate of oxygen injection into the stripper bottom or by changing the composition of the injected oxygen by dilution with nitrogen, air or steam. Since the catalyst at the bottom of the stripper will be 300-450° F. (about 150-230° C.) hotter, possibly as high as about 1800° F. (about 980° C.) but preferably about 1300-1400° F. (about 700-760° C.) in the lower part of the stripper there will be a significant benefit due to the "hot stripping" taking place in the reactor. The coke on the stripped catalyst be substantially reduced by at least 25% due to higher stripper temperature. This will result in an increase in FCC yield although catalyst make up requirements may need to be increased as a result of increased catalyst aging at the higher temperatures and lower nitrogen dilution in the regeneration zone. At the temperatures prevailing in the oxygen-fed stripper, the coke will tend to crack and release hydrocarbons in addition to the usual cracking products derived from the feed. This, in turn, will reduce the net amount of coke needing to be removed by combustion and will have a consequential effect on the heat balance: some heat will be lost by consumption in the endothermic coke cracking.

The stripping section preferably contains vapor-liquid mixing devices such as structured packing. The metallurgy of the stripper section should be suitable for meeting the higher stripper temperatures and presence of oxygen which are encountered and resort may be made to the use of refractory linings. The stripper trays may be fabricated from high temperature, abrasion-resistant steels such as high nickel and/or chromium alloys and ceramic coatings may be utilized, especially on the upper surfaces of the trays for optimal abrasion resistance at the high operational temperatures.

The combustion gases produced in the stripper can be taken to the FCC gas plant which recovers a CO containing fuel gas stream although the high CO content which may be obtained may make other uses, e.g., feed to a hydrogen or syngas plant. The conventional contaminant removal methods typically applied to the fuel gas, e.g. water washing, may be used to remove $H_2S$, $NH_3$, HCN, etc.

Tonnage oxygen is generally available and can be supplied in adequate quantities either by tanker or by the provision of an on-site oxygen plant at the refinery to provide the oxygen required; the cost of an oxygen plant is estimated at roughly 20% of the current regenerator and flue gas train investment. Net operating expense can be reduced by finding a market for the co-produced nitrogen, e.g. in artificial fertilizer production or as an inert gas supply.

Although the main economic driver for the use of the oxygen stripper comes from the potential for eliminating the separate regenerator and its flue gas system, an additional utility may be found when the unit is capacity limited by heat balance.

In existing units, the heat required to support the endothermic cracking reaction comes mainly from the regenerator with the heat passed from the regenerator to the cracking section by the hot regenerated catalyst. Only a small portion of the total energy requirement is supplied by feed preheat. For units processing all but the heaviest feeds (highest ConCarbon content), the oxygen stripper may be integrated with the existing regenerator to supply a portion of the reaction heat while using the regenerator to supply the balance of the heat requirement. The modifications to the unit are potentially minor in nature since the existing regenerator is retained. The regeneration off-gases can be sent to the refinery fuel gas system where contaminants can be removed. The heat normally supplied by the combustion of the 'discretionary coke' can thus be replaced by integrating an oxygen-fed stripper and a smaller auxiliary regenerator in which a portion of the catalyst is regenerated to supply additional heat.

Figure 3:
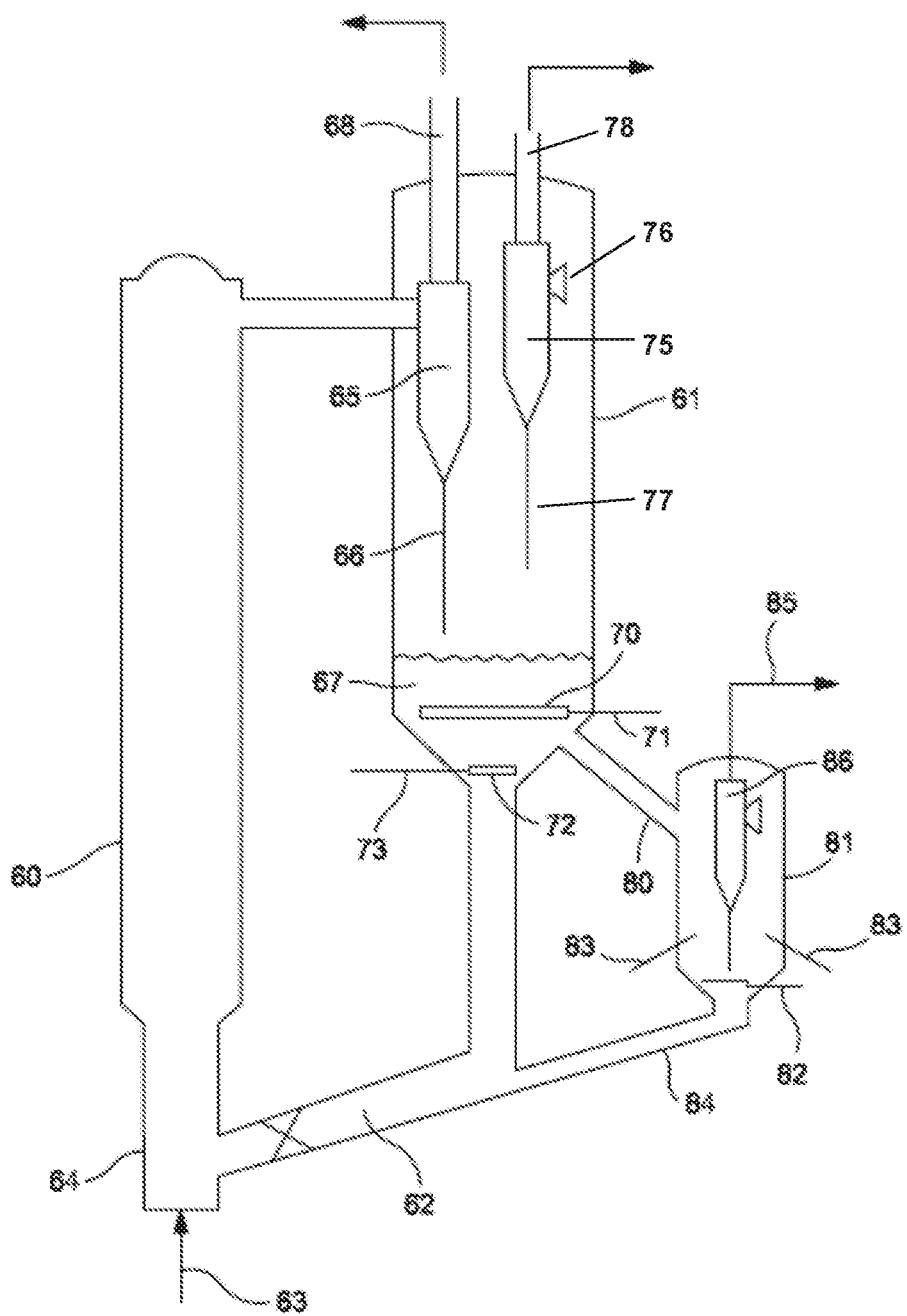
FIG. 3 is an extremely simplified diagram of a fluid catalytic cracking unit with an external riser, an oxygen-fed stripper section and an auxiliary regenerator.

FIG. 3 shows a much simplified diagram of a unit incorporating an oxygen-fed stripper with an auxiliary regenerator/heater used to supply the balance of heat for the cracking operation. The unit has an external riser 60 and reactor vessel 61 with a regenerated catalyst standpipe 62 leading to mix zone 64 at the foot of the riser which is also fed by the heavy oil feed from line 63. The cracking products are separated from the spent catalyst in reactor cyclone 65 with the catalyst passing down dipleg 66 into the stripper bed 67 while the cracked hydrocarbons pass out from the reactor from the gas outlet of the cyclone to the main column by way of duct 68. Air, oxygen-enriched air or relatively pure oxygen is fed into the stripper bed through sparger 70 fed by means of line 71. Fluidization steam is supplied through sparger 72 from line 73. The stripper off-gases pass into stripper cyclone 75 through inlet horn 76; catalyst particles are returned to the catalyst bed through dipleg 77 while the off-gases pass out through duct 78 to the refinery gas plant which recovers fuel gas to be sent to fuel gas system for clean-up and utilization.

A slip stream of catalyst is taken from the stripper bed by way of standpipe 80 to heater/regenerator vessel 81 which is provided with a combustion gas (air, oxygen-enriched air, oxygen) through line 82 with its associated sparger in the vessel. For existing units air is preferred combustion gas entering vessel 81.

When heater/regenerator 81 is operated in the regeneration mode, i.e. carrying out some regeneration of the spent catalyst, the port to the standpipe is may be located near the top of the stripper catalyst bed where the catalyst still contains a major proportion of coke although most of the occluded hydrocarbons have been stripped out by the hot gases ascending from the lower levels of the stripper. The hot catalyst stream leaves vessel 81 by way of standpipe 84 to join the catalyst stream from the oxygen stripper in standpipe 62. Off-gases from vessel 81 pass to the fuel gas system through duct 85 from the internal stripper cyclone 86.

What is claimed is:

1. A fluid catalytic cracking process in which a heavy oil feed is cracked, which comprises:
    contacting a stream of heavy oil feed with a stream of hot, particulate cracking catalyst to crack the feed to form cracked hydrocarbon products of lower boiling range while depositing coke on the catalyst to form spent catalyst containing occluded hydrocarbons;
    separating the cracked hydrocarbon products from the spent catalyst;
    contacting the spent catalyst in a hydrocarbon stripping zone comprising at least one cyclone with an oxygen-containing gas to combust the coke deposited on the catalyst to strip occluded hydrocarbons from the spent catalyst and regenerate the spent catalyst by combustion of the coke on the catalyst, so forming a regenerated catalyst at a higher temperature; and
    directly passing the regenerated catalyst from the stripping zone into contact with a stream of heavy oil feed.

2. A process according to claim 1 in which the oxygen-containing gas of the stripping step comprises air.

3. A process according to claim 1 in which the oxygen-containing gas of the stripping step comprises oxygen-enriched air.

4. A process according to claim 1 in which the oxygen-containing gas of the stripping step comprises oxygen at a purity of at least 90% v/v.

5. A process according to claim 1 in which the spent catalyst is contacted in the stripping step in a dense fluidized bed.

6. A process according to claim 1 in which the temperature of the catalyst during the stripping step attains a value of up to 1800° F. (980° C.).

7. A process according to claim 1 in which the coke on the catalyst is combusted in the stripping step to form a mixture of CO and $CO_2$.

8. A process according to claim 7 in which the coke on the catalyst is combusted in the stripping step to form a mixture of CO and $CO_2$ containing at least 50% more CO than $CO_2$.

9. A process according to claim 1 in which a portion of the spent catalyst is separately heated before being brought into contact with a stream of heavy oil feed.

10. A process according to claim 9 in which a portion of the spent catalyst is separately heated by combustion of catalytic coke in an auxiliary regenerator.

11. A process according to claim 1 in which the reactor riser effluent and stripper off-gas are co-processed in a common cyclone and downstream of the cyclone.

12. A process according to claim 1 which is carried out in an FCC unit in which the reactor riser effluent and stripper off-gas are co-processed in a main fractionator column, wet gas compressor and/or unsaturated gas plant of the unit.

13. A process according to claim 1 which is carried out in an FCC unit in which the stripper off-gas is removed from a reactor vessel separately from the stripper off-gas.

14. A fluid catalytic cracking unit for the production cracked hydrocarbons from a heavy oil feed, which comprises:
    a cracking zone in which the heavy oil feed is contacted with a hot cracking catalyst to crack the feed and form cracked hydrocarbons of lower boiling range while depositing coke on the catalyst to form spent catalyst containing occluded hydrocarbons;
    a disengagement zone in which the cracked hydrocarbons are separated from the spent catalyst containing occluded hydrocarbons and deposited coke;
    a stripping zone in direct communication with the disengagement zone for receiving spent catalyst containing occluded hydrocarbons and deposited coke directly from the disengagement zone, the stripping zone including a supply of an oxygen-containing stripping and regeneration gas and a sparger in the stripping zone with the oxygen-containing stripping and regeneration gas from the supply to strip occluded hydrocarbons from the spent catalyst and regenerate the spent catalyst by combustion of the coke on the catalyst, so forming a stripped, regenerated catalyst at a higher temperature; and
    a conduit for directly conveying the regenerated catalyst into contact with a stream of heavy oil feed in the cracking zone.

15. A fluid catalytic cracking unit according to claim 14 in which the cracking zone includes a riser reaction zone in which heavy oil feed and regenerated catalyst are fed into contact with one another at the foot of the riser.

16. A fluid catalytic cracking unit according to claim 15 in which the disengagement zone comprises at least one cyclone.

17. A fluid catalytic cracking unit according to claim 14 in which the stripping zone comprises a dense fluidized bed zone into which the oxygen-containing stripping and regeneration gas is fed at the bottom of the zone and stripping off-gases included vapors from occluded hydrocarbons and combustion products of the coke on the spent catalyst are removed from the top of the dense fluidized bed.

18. A fluid catalytic cracking unit according to claim 14 in which the stripping zone comprises a series of stripper trays over which the spent catalyst is to pass to contact the oxygen-containing stripping and regeneration gas.

19. A fluid catalytic cracking unit according to claim 14 which includes:
    a regenerator vessel;
    a conduit for supplying a slip stream of spent catalyst to the regenerator vessel from the stripping zone; and
    a conduit for conveying catalyst from the regenerator vessel into contact with a stream of heavy oil feed in the cracking zone.

20. A fluid catalytic cracking unit according to claim 19 which includes means for supplying an oxygen-containing regeneration gas to the regenerator vessel and a sparger in the regenerator vessel with oxygen-containing stripping and regeneration gas from the supply to strip occluded hydrocarbons from the spent catalyst and regenerate the spent catalyst by combustion of the coke on the catalyst in the regenerator vessel, so forming a stripped, regenerated catalyst at a higher temperature.

* * * * *